US010600033B2

(12) United States Patent
Grødum et al.

(10) Patent No.: US 10,600,033 B2
(45) Date of Patent: Mar. 24, 2020

(54) DELEGATING RESOURCES WHEN SCHEDULING MEETINGS

(71) Applicant: Cisco Technology, Inc., San Jose, CA (US)

(72) Inventors: Nicolai Grødum, Oslo (NO); Wouter Lammers, Oslo (NO)

(73) Assignee: Cisco Technology, Inc., San Jose, CA (US)

(*) Notice: Subject to any disclaimer, the term of this patent is extended or adjusted under 35 U.S.C. 154(b) by 255 days.

(21) Appl. No.: 15/627,902

(22) Filed: Jun. 20, 2017

(65) Prior Publication Data
US 2018/0365655 A1   Dec. 20, 2018

(51) Int. Cl.
*G06Q 10/00* (2012.01)
*G06Q 10/10* (2012.01)
*G06Q 10/06* (2012.01)
*G06F 16/487* (2019.01)
*G06F 16/48* (2019.01)

(52) U.S. Cl.
CPC ....... *G06Q 10/1095* (2013.01); *G06F 16/487* (2019.01); *G06F 16/489* (2019.01); *G06Q 10/063114* (2013.01)

(58) Field of Classification Search
None
See application file for complete search history.

(56) References Cited

U.S. PATENT DOCUMENTS

| | | | | |
|---|---|---|---|---|
| 5,111,391 A | * | 5/1992 | Fields | G06Q 10/06 705/7.14 |
| 5,406,476 A | * | 4/1995 | Deziel, Jr. | G06Q 10/06 705/7.15 |
| 5,408,663 A | * | 4/1995 | Miller | G06Q 10/06 718/104 |
| 5,467,268 A | * | 11/1995 | Sisley | G06Q 10/06 705/7.16 |
| 5,842,173 A | * | 11/1998 | Strum | G06Q 50/22 705/2 |
| 6,003,061 A | * | 12/1999 | Jones | G06F 9/50 718/102 |
| 6,049,776 A | * | 4/2000 | Donnelly | G06Q 10/063112 705/7.14 |
| 6,216,109 B1 | * | 4/2001 | Zweben | G06Q 10/0631 705/7.12 |

(Continued)

*Primary Examiner* — Gurkanwaljit Singh
(74) *Attorney, Agent, or Firm* — Edell, Shapiro & Finnan, LLC

(57) ABSTRACT

Techniques are presented herein for scheduling meetings for participants by a scheduling system in communication with a resource allocation system that determines and allocates the resources for a requested meeting, when the resources are available. The scheduling system receives a request from a client device, where the request is to schedule a first meeting. The scheduling system then sends a query to the resource allocation system, where the query includes one or more constructs that represent resources previously allocated to one or more scheduled second meetings by the resource allocation system. The scheduling system then receives a notification from resource allocation system. The notification includes one or more additional constructs representing the resources that the resource allocation system has allocated to the first meeting.

20 Claims, 13 Drawing Sheets

(56) References Cited

U.S. PATENT DOCUMENTS

| | | | | |
|---|---|---|---|---|
| 6,341,303 B1* | 1/2002 | Rhee | G06F 9/4881 | 710/240 |
| 6,571,215 B1* | 5/2003 | Mahapatro | G06Q 10/06 | 705/7.12 |
| 6,823,315 B1* | 11/2004 | Bucci | G06Q 10/06 | 705/7.16 |
| 6,850,895 B2* | 2/2005 | Brodersen | G06Q 10/06 | 705/7.14 |
| 7,343,313 B2* | 3/2008 | Dorenbosch | G06Q 10/109 | 705/7.19 |
| 8,306,841 B2* | 11/2012 | Clarke | G06Q 10/063118 | 705/7.23 |
| 8,315,901 B2* | 11/2012 | Cameron | G06Q 10/00 | 705/7.13 |
| 8,448,015 B2* | 5/2013 | Gerhart | G06Q 10/06 | 714/4.4 |
| 2001/0051888 A1* | 12/2001 | Mayhak, Jr. | G06Q 10/063112 | 705/7.14 |
| 2002/0029161 A1* | 3/2002 | Brodersen | G06Q 10/06 | 705/7.14 |
| 2003/0033180 A1* | 2/2003 | Shekar | G06Q 10/06 | 705/7.37 |
| 2003/0101091 A1* | 5/2003 | Levin | G06Q 10/06398 | 705/7.42 |
| 2003/0208392 A1* | 11/2003 | Shekar | G06Q 10/06 | 705/7.22 |
| 2004/0039628 A1* | 2/2004 | Thompson | G06Q 10/0631 | 705/2 |
| 2004/0064355 A1* | 4/2004 | Dorenbosch | G06Q 10/109 | 705/7.19 |
| 2004/0158568 A1* | 8/2004 | Colle | G06Q 10/06 | |
| 2004/0267595 A1* | 12/2004 | Woodings | G06Q 10/06 | 705/7.14 |
| 2006/0053043 A1* | 3/2006 | Clarke | G06Q 10/063118 | 705/7.17 |
| 2006/0167733 A1* | 7/2006 | Scott | G06Q 10/00 | 705/7.12 |
| 2006/0236368 A1* | 10/2006 | Raja | G06F 9/5027 | 726/1 |
| 2007/0083868 A1* | 4/2007 | Sankaranarayan | G06F 9/5038 | 718/104 |
| 2008/0027783 A1* | 1/2008 | Hughes | G06Q 10/00 | 705/7.14 |
| 2008/0172282 A1* | 7/2008 | McNeill | G06Q 10/06 | 705/7.18 |
| 2008/0270179 A1* | 10/2008 | Meiner | G06Q 10/06 | 705/2 |
| 2008/0300954 A1* | 12/2008 | Cameron | G06Q 10/00 | 705/7.16 |
| 2009/0006160 A1* | 1/2009 | Boegner | G06Q 10/06 | 705/7.16 |
| 2009/0138322 A1* | 5/2009 | Joyner | G06Q 10/06 | 705/7.38 |
| 2009/0228321 A1* | 9/2009 | Srinivasan | G06Q 10/109 | 705/7.19 |
| 2009/0265205 A1* | 10/2009 | Stinchcombe | G06Q 10/06 | 705/37 |
| 2013/0038673 A1* | 2/2013 | Hiller | G06Q 10/06 | 348/14.07 |
| 2014/0278673 A1 | 9/2014 | Wetzold et al. | | |
| 2016/0036875 A1* | 2/2016 | High | H04L 65/4038 | 709/204 |
| 2016/0140508 A1 | 5/2016 | Ossia et al. | | |
| 2016/0267439 A1 | 9/2016 | Bitran et al. | | |
| 2016/0283909 A1 | 9/2016 | Adiga | | |
| 2016/0307167 A1* | 10/2016 | Bathiya | G06Q 10/1095 | |

* cited by examiner

DELEGATING RESOURCES WHEN SCHEDULING MEETINGS

TECHNICAL FIELD

The present disclosure relates to scheduling meetings, and more specifically, to delegating resources to the scheduled meetings.

BACKGROUND

When scheduling or calendaring a meeting, especially video conference meetings, two systems, each with separate responsibilities, are utilized to schedule the resources required for the meeting. Typically, a scheduling system is responsible for a calendar database of bookings and meetings, while a resource allocation system contains the logic to determine if the requested meeting is possible given the available resources and how the requested meeting will be facilitated. While these two systems are independent of each other, they need to interact with one another.

DESCRIPTION OF EXAMPLE EMBODIMENTS

Overview

In one embodiment, a first server receives a request from a client device. The request is to schedule a first meeting. The first server then sends a query to a second server, wherein the query includes one or more constructs that represent resources that have been previously allocated to one or more scheduled second meetings by the second server. The first server then receives a notification from the second server. This notification includes one or more additional constructs representing the resources that the second server has allocated to the first meeting.

Example Embodiments

In one embodiment, a method is provided for determining, when scheduling a meeting, if the resources to support the meeting are available at the requested time for the meeting, and then allocating or delegating resource to the meeting. In this embodiment, the scheduling system and the resource allocation system operate independently of one another, where the scheduling system maintains the calendar and time data, and the resource allocation system maintains the logic to manage and delegate the resources to meetings. Thus, the logic does not need to be duplicated onto the scheduling system for each resource allocation system, and each resource allocation system does not need to maintain calendaring logic. In other words, the scheduling system does not need to understand the logic of the resource allocation system, and the resource allocation system does not need to understand the concept of time, recursion and scheduling. This also eliminates the need for the scheduling system and the resource allocation system to synchronize logic and/or calendaring systems with one another.

Figure 1:
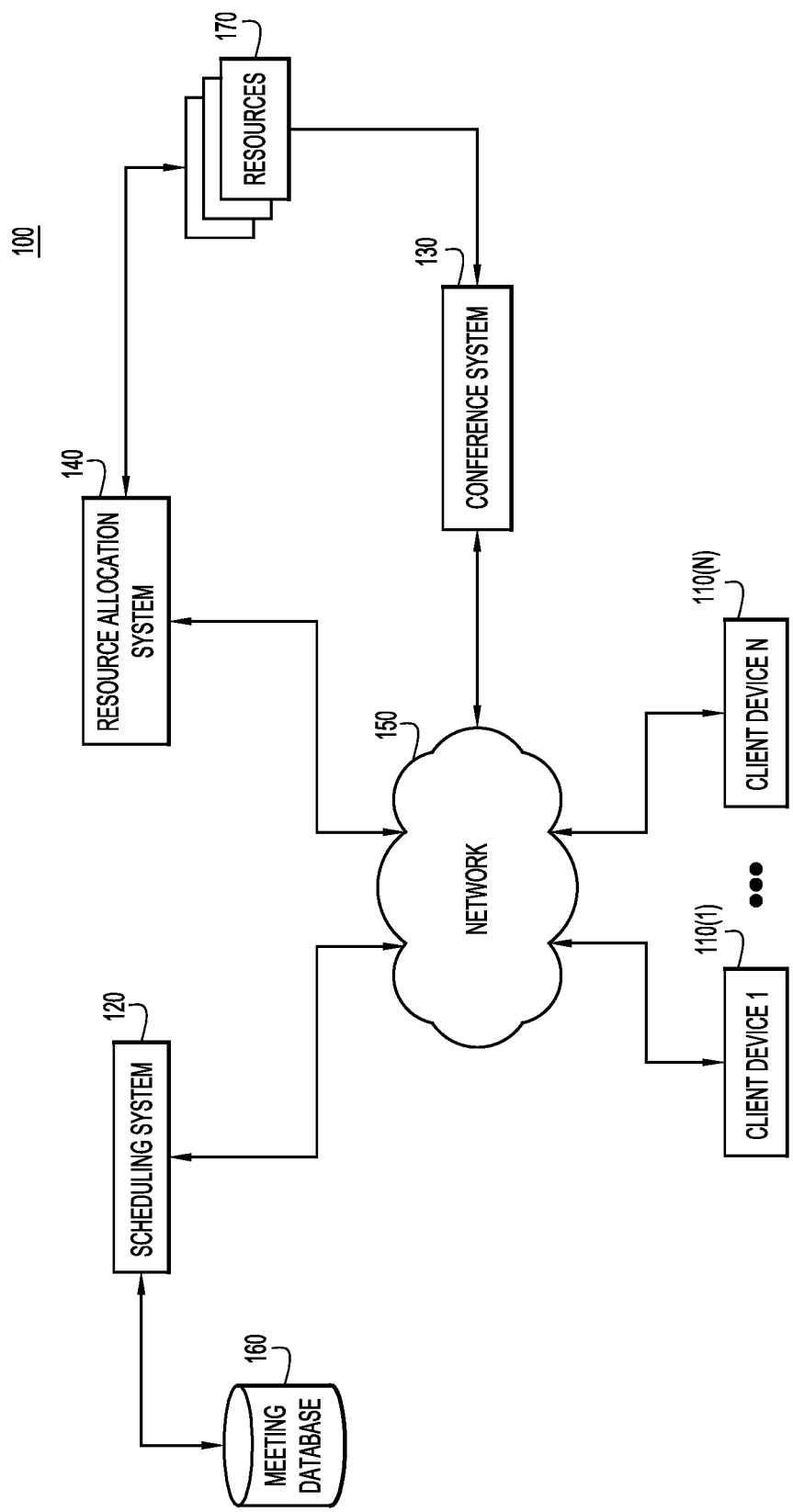
FIG. 1 is a block diagram of an environment for allocating resources to a meeting when scheduling a meeting, according to an example embodiment.

With reference to FIG. 1, there is depicted a block diagram of a networking/computing environment 100 in which meetings may be scheduled, and in which meetings may be held between client devices. The environment 100 includes a plurality of client devices 110(1)-110(N), a scheduling system 120, a video conference system 130, and a resource allocation system 140. Each of the devices or systems of the environment 100 is capable of communicating over the network 150. Network 150 may include one or more wide area networks (WANs), such as the Internet, and one or more local area networks (LANs). The client devices 110(1)-110(N) may be configured to enable the users of the client devices 110(1)-110(N) to schedule meetings through the scheduling system 120. Thus, the scheduling system 120 operates scheduling services that allow the participants/users of the client devices 110(1)-110(N) to schedule meetings with one another. The scheduling system 120 may include calendaring logic that enables the scheduling system 120 to understand the concepts of dates and time. After scheduling a meeting, the scheduling system 120 may store the scheduled meetings in meeting database 160. For each scheduled meeting, the scheduling system 120 would further store, in meeting database 160, information about what needs to be provided for the scheduled meeting to take place (e.g., URLs, numbers, etc.) and information regarding the placement of the scheduled meeting (e.g., whether or not the scheduled meeting can be moved). In addition, the scheduling system 120 may provide meeting reminders to the client devices 110(1)-110(N) to remind the users of the client devices 110(1)-110(N) of an upcoming meeting. In some embodiments, the scheduling system 120 may be located on premises, but in other embodiments, the scheduling system 120 may be located remotely (i.e., in the cloud).

Furthermore, the client devices 110(1)-110(N) may also be configured to enable the users of the client devices 110(1)-110(N) to conduct or participate in meetings through the conference system 130. The conference system 130 of the meeting environment 100 is configured to host and support the exchange of data between client devices 110(1)-110(N). The conference system 130 may facilitate any type of meeting, including, but not limited to, audio conferencing, video conferencing, etc. The conference system 130 utilizes resources 170 to manage and facilitate meeting(s) between client devices 110(1)-110(N). Resources 170 include, but are not limited to, conference bridges, bridge pools, video ports, routers, relays, etc. Resources 170 may further include multipoint control units (MCUs), transcoders, recording devices, transcoding bots, exhaustible network links, etc. In addition, resources 170 may also include collaboration session features such as data conferencing or sharing technologies that add experiences to participants of a collaboration session. As illustrated in further detail below, the amount of resources utilized by the conference system 130 may depend on, but is not limited to, the number of meetings occurring simultaneously, the type of meeting, the type of data shared between client devices 110(1)-110(N) during a meeting, etc.

The resource allocation system 140 of the meeting environment 100 manages the resources 140 for meetings conducted through the conference system 130. The resource allocation system 140 contains logic that enables the resource allocation system 140 to select which resources 170 to use for each meeting, and balance the meeting load across the resources 170. The resource allocation system 140 may be configured to dynamically optimize the resources 170 of each meeting being conducted as other meetings start, end, or change their resource requirements. As further detailed below, the resource allocation system 140 may be configured to communicate with the scheduling system 120 when scheduling a meeting. More specifically, the resource allocation system 140 is configured to analyze constructs, tokens, or other data structures received from the scheduling system 120. When scheduling a requested meeting, the scheduling system 120 may send one or more constructs to the resource allocation system 140 of previously scheduled meetings that at least partially overlap the requested meeting. Each of the one or more constructs serves as a representation of the resources 170 that have been previously allocated by the resource allocation system 140 to their respective previously scheduled meetings. The resource allocation system 140 is configured to analyze the constructs received from the scheduling system 120 to determine the resources 170 that have been previously allocated to the overlapping previously scheduled meetings and make a determination as to whether or not resources 170 remain available for the requested meeting during the duration of the requested meeting. If the resources 170 are available, the resource allocation system 140 may create and send to the scheduling system 120 a construct representing the resources 170 that the resource allocation system 140 has allocated to the requested meeting. The construct may be stored by the scheduling system 120 in the meeting database 160 to be subsequently sent back to the resource allocation system 140 upon attempting to schedule another meeting.

The client devices 110(1)-110(N) of environment 100 may be any type of computing device including, without limitation, personal computer (PC) devices, such as stationary (e.g., desktop) computers, laptop computers, or any other type of mobile computing device such as cellular (smart) mobile phones (e.g., cell phones, also referred to as mobile phones), note pads, tablets, personal data assistant (PDA) devices, and other portable media devices. The client devices 110(1)-110(N), the scheduling system 120, the conference system 130, and the resource allocation system 140 of the environment 100 can utilize any suitable operating system to facilitate the scheduling of meetings, the management of meetings, and the allocation of resources for the meetings. In addition, the techniques described herein for scheduling meetings via the scheduling system 120 can be integrated with any suitable type of commercial software products and scheduling or calendaring services, which may be provided by the scheduling system 120.

Referring now to FIGS. 2A-2D, and with continued reference to FIG. 1, illustrated is chart 200 that depicts the calendar of the scheduling system 120 when attempting to schedule a requested meeting 210. As illustrated, the requested meeting 210 has been requested to be scheduled at a time that at least partially overlaps with three previously scheduled meetings 220, 230, and 240. The chart 200 depicts the requested meeting 210, previously scheduled meetings 220, 230, and 240, and their relationship to one another in time. As illustrated, the requested meeting 210 is a meeting that contains resource requirements 212 for high definition (HD) video for four meeting participants. Furthermore, previously scheduled Meeting A 220 contains an associated construct 222 that indicates that Meeting A 220 has been allocated three ports on resource 1 by the resource allocation system 140. Previously scheduled Meeting B 230 contains a construct 232 that indicates that Meeting B 230 has been allocated four ports on resource 2 by the resource allocation system 140. As further depicted, previously scheduled Meeting C 240 contains an associated construct 242 that indicates that Meeting C 240 has been allocated five ports on resource 1 by the resource allocation system 140.

As previously explained, the chart 200 illustrated in FIGS. 2A-2D depicts the time relationship between the requested meeting 210 and the previously scheduled meetings 220, 230, 240. The chart 200 contains five time sections or time periods 250, 252, 254, 256, 258. Furthermore, according to the chart 200, Meeting A 220 begins prior to time period 250, extends through the first and second time periods 250, 252, and ends prior to the start of the third time period 254. Meeting B 230, however, starts at the beginning of the first time period 250, and extends through the first, second, and third time periods 250, 252, 254, ending prior to the start of the fourth time period 256. In addition, Meeting C 240 starts at the beginning of the fifth time period 258 and extends through and beyond the fifth time period 258. The requested meeting 210 is requested to start at the beginning of the second time period 252, and extend through the third, fourth, and fifth time periods 254, 256, 258, and end at the end of the fifth time period 258. In other words, the time periods 250, 252, 254, 256, 258 represent the time periods of various different overlapping combinations of the meetings 210, 220, 230, 240. Thus, the first time period 250 represents the time that only Meeting A 220 and Meeting B 230 overlap one another. The second time periods 252 represents the time that Meeting A 220, Meeting B 230, and the requested meeting 210 overlap one another. The third time period 254 represents the time that only Meeting B 230 and the requested meeting 210 overlap one another. The fourth time period 256 represents the time that the requested meeting 210 does not overlap any previously scheduled meetings. Finally, the fifth time period 258 represents the time that only Meeting C 240 and the requested meeting 210 overlap one another.

Figure 2A:
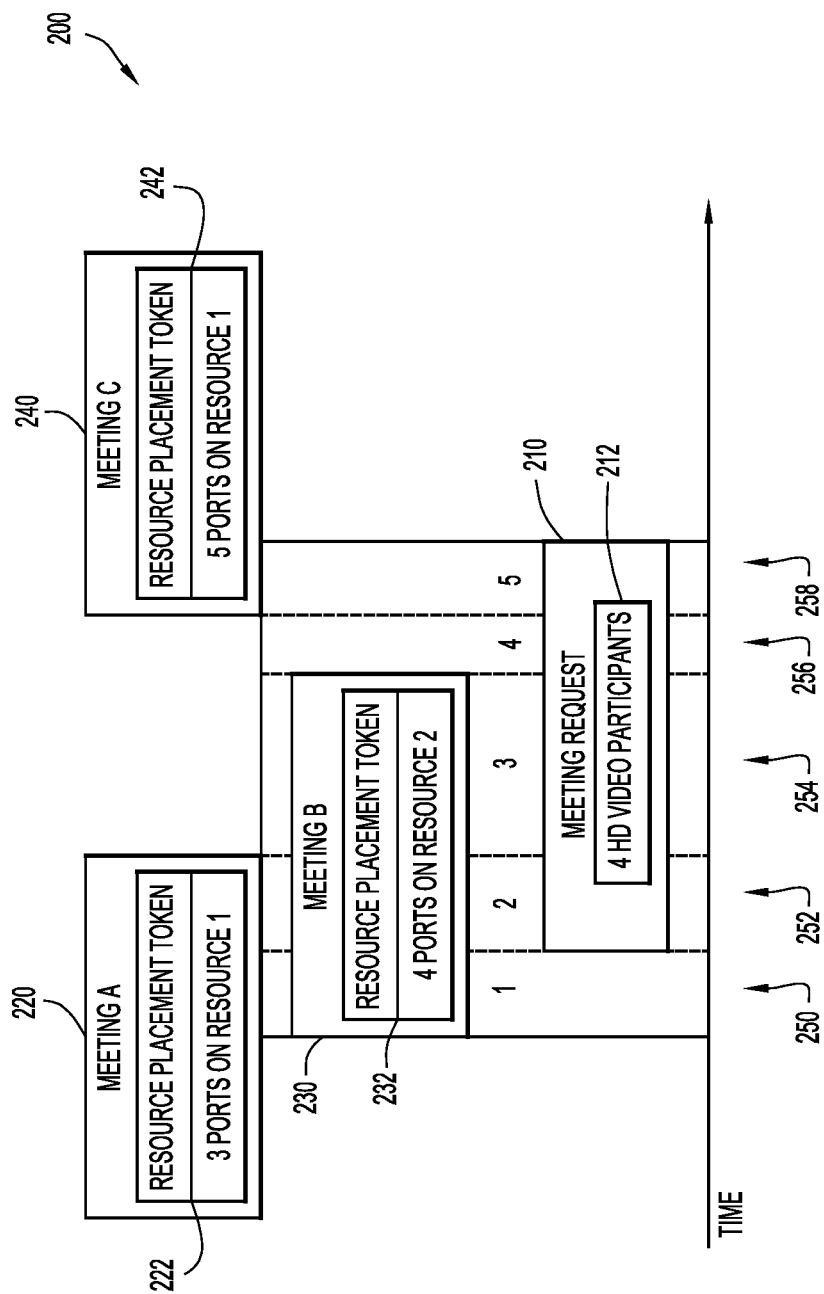
FIGS. 2A-2D are a graphical diagrams depicting a requested meeting and previously scheduled meetings, wherein the requested meeting overlaps with the previously scheduled meetings, in accordance with an example embodiment.
Figure 2B:
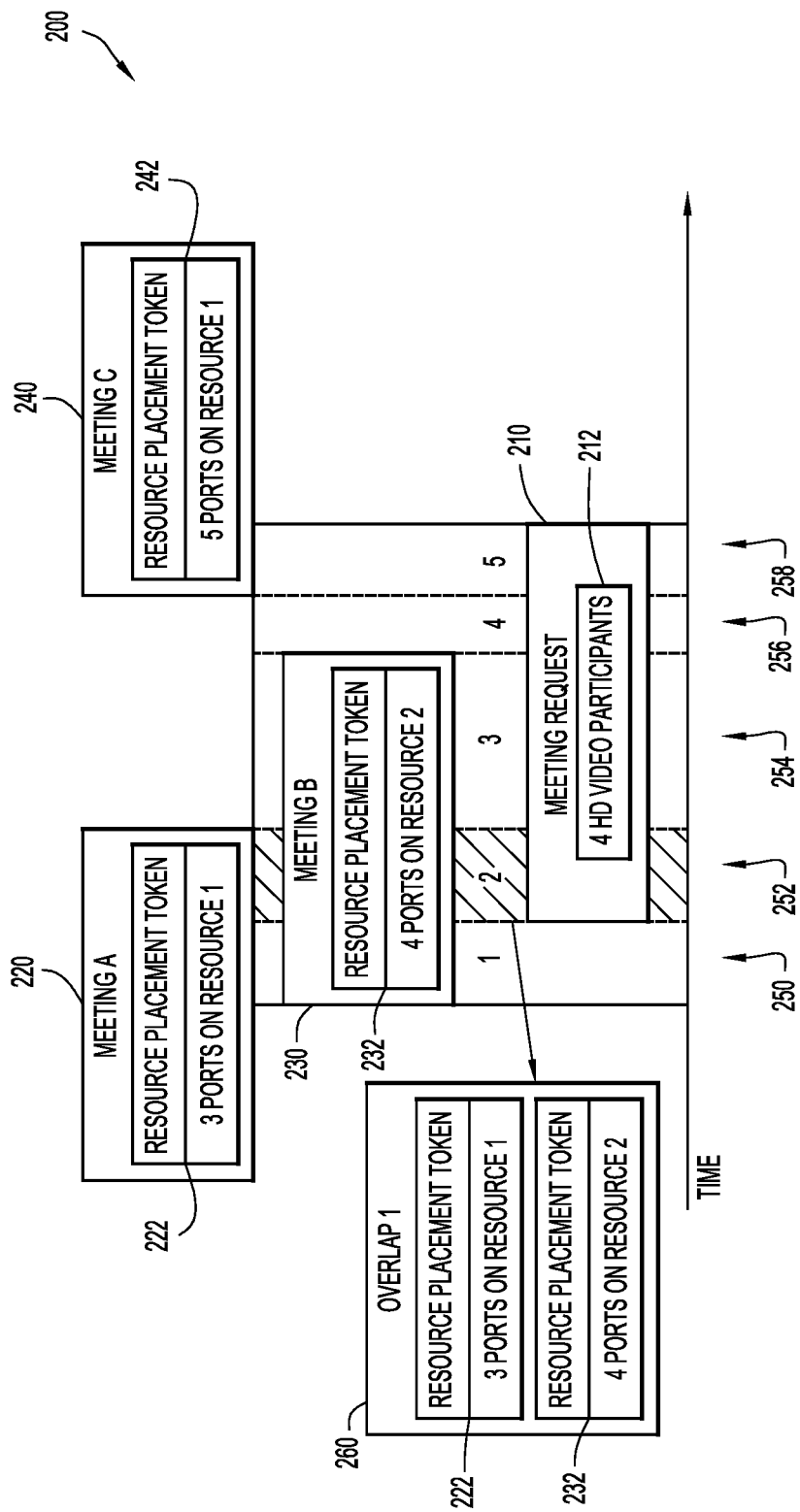

As illustrated in FIG. 2B, when attempting to schedule the requested meeting 210, the scheduling system 120 would determine and identify that the requested meeting 210 at least partially overlaps Meeting A 220 and Meeting B 230 during the second time period 252. After identifying this first overlap, the scheduling system 120 would create a first overlap set of constructs 260 that contains constructs 222 and 232 from the two previously scheduled meetings 220, 230 that the requested meeting 210 overlaps during the second time period 252.

Figure 2C:
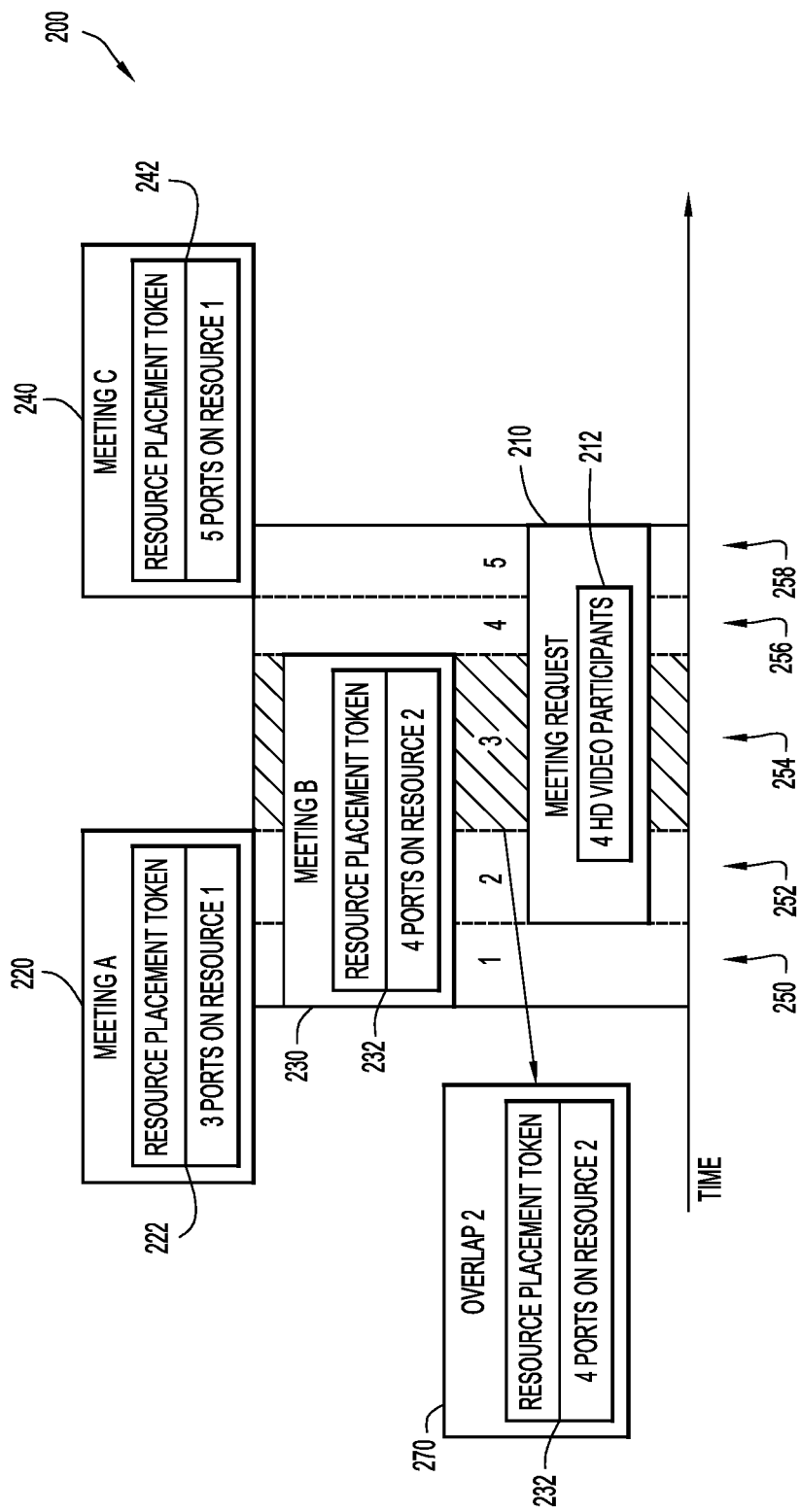

As illustrated in FIG. 2C, the scheduling system 120 would further determine and identify that the requested meeting 210 also at least partially overlaps Meeting B 230 during the third time period 254. After identifying this second overlap, the scheduling system 120 would create a second overlap set of constructs 270 that contains the construct 232 from previously scheduled Meeting B 230 that the requested meeting 210 overlaps during the third time period 254.

Figure 2D:
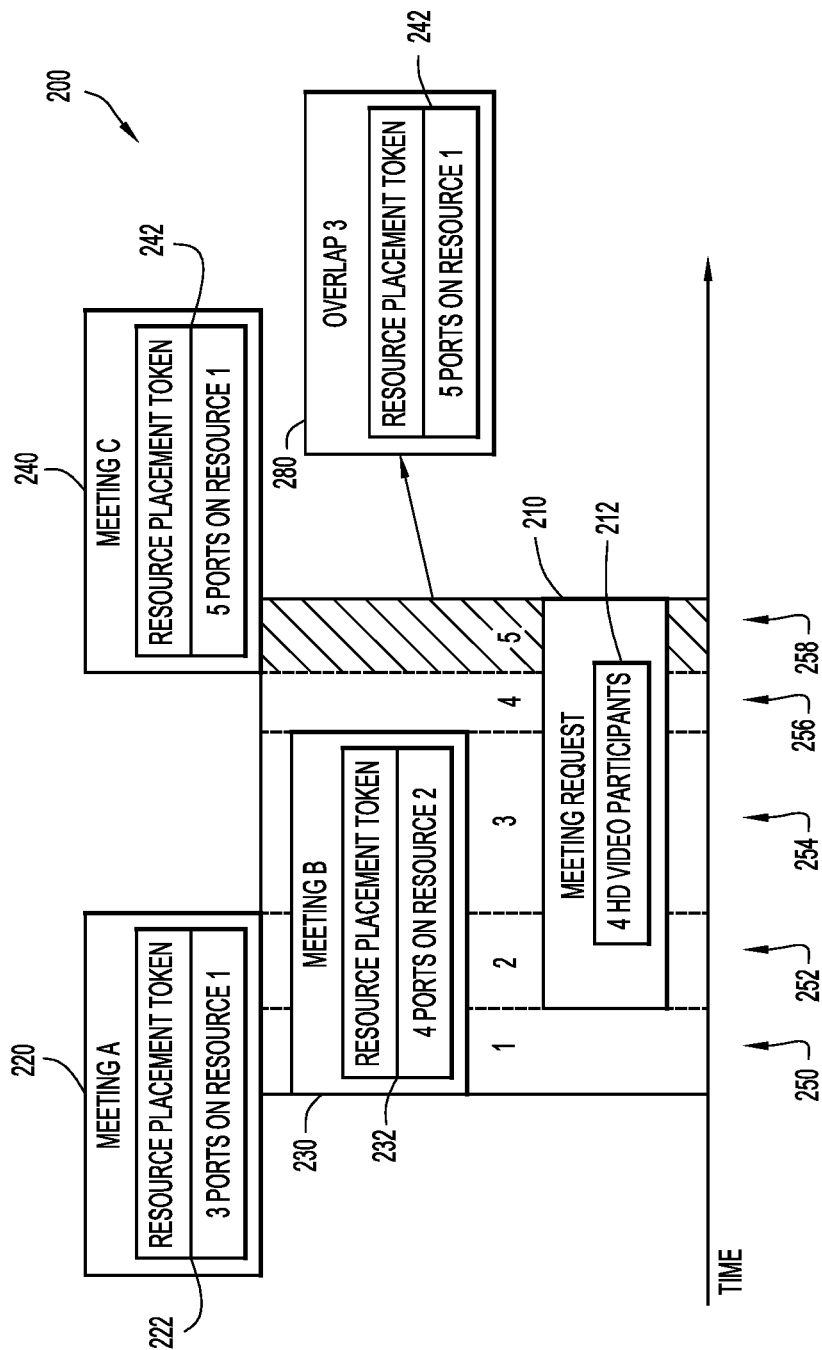

Finally, as illustrated in FIG. 2D, the scheduling system 120 would also determine and identify that the requested meeting 210 also at least partially overlaps Meeting C 240 during the fifth time period 258. After identifying this third overlap, the scheduling system 120 would create a third overlap set of constructs 280 that contains the construct 232 from previously scheduled Meeting B 230 with which the requested meeting 210 overlaps during the third time period 254.

As further illustrated in FIGS. 2A-2D, the requested meeting 210 does not overlap any previously scheduled meetings during the first time period 250 because the requested meeting 210 does not extend into the first time period 250. In addition, the requested meeting 210 does not overlap any previously scheduled meetings during the fourth time period 256 because the previously scheduled meetings 220, 230, 240 do not extend into the fourth time period 256.

Figure 3A:
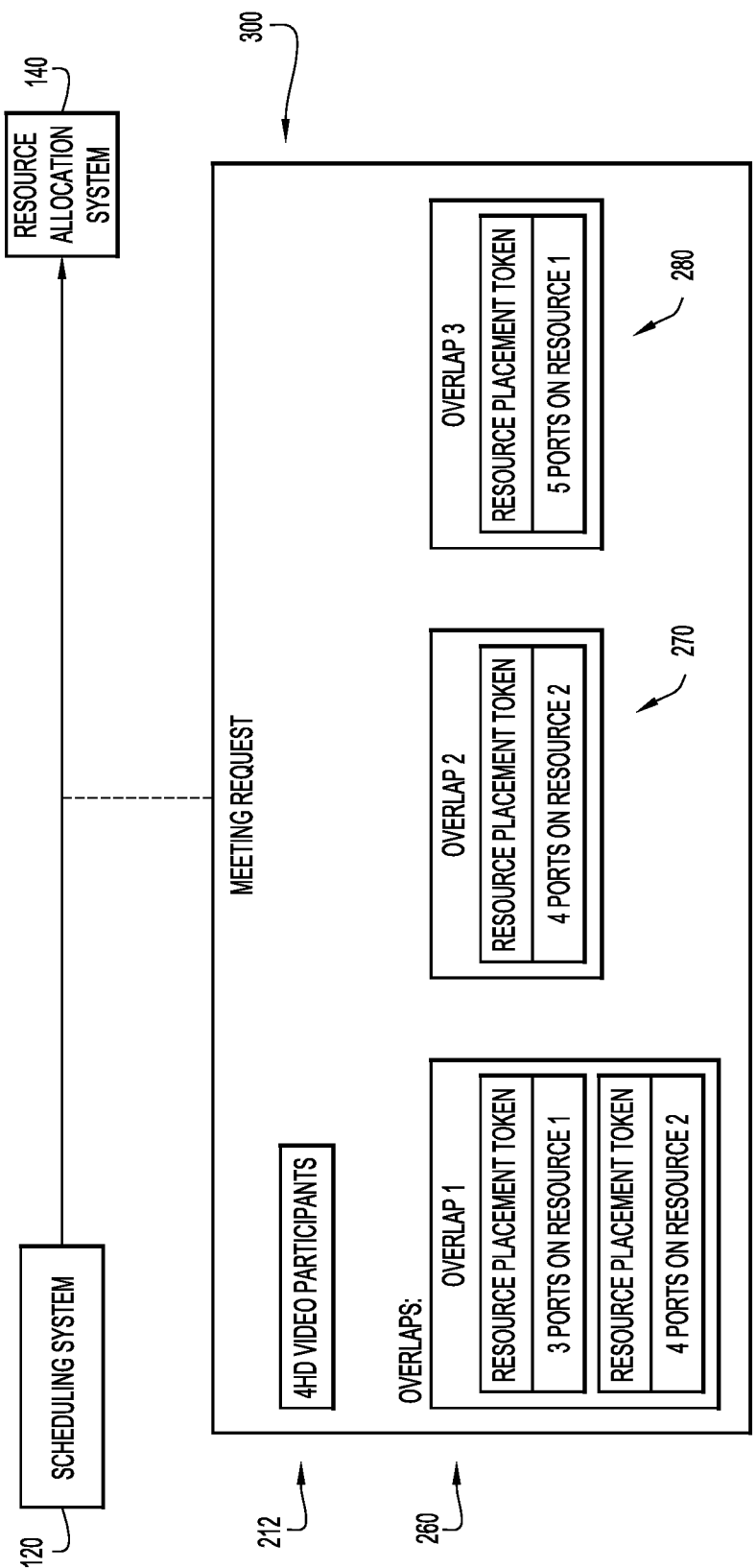
FIGS. 3A-3C are diagrams depicting communications sent between the scheduling system and the resource allocation system, according to an example embodiment.
Figure 3B:
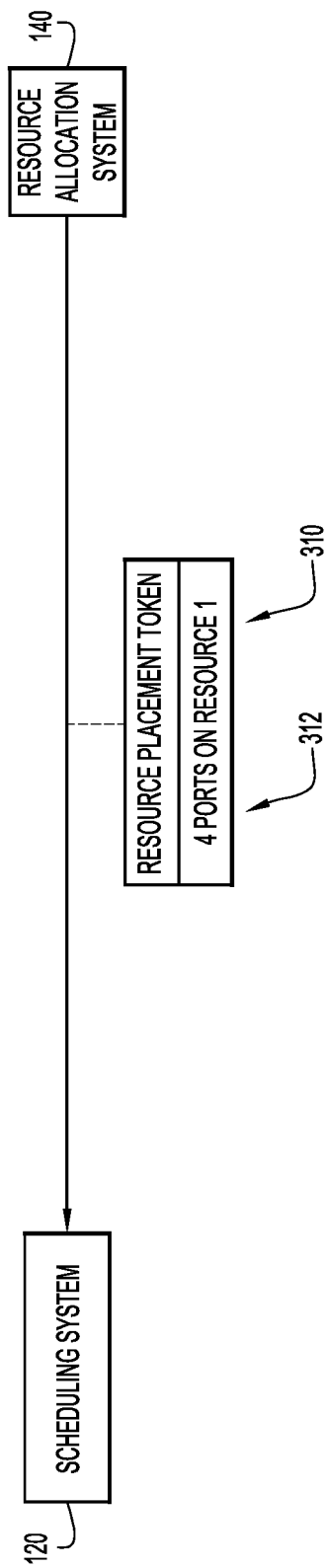
Figure 3C:
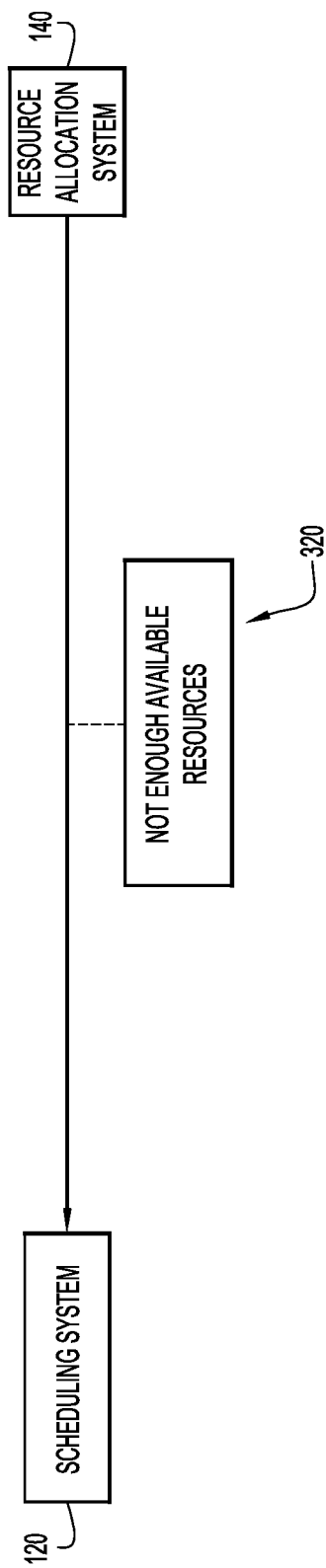

Referring now to FIGS. 3A-3C, and with continued reference to FIGS. 1 and 2A-2D, illustrated are various communications sent between the scheduling system 120 and the resource allocation system 140. Depicted in FIG. 3A is a message or query 300 sent from the scheduling system 120 to the resource allocation system 140 after the scheduling system 120 has identified and created each of the overlaps sets of constructs 260, 270, 280 for the requested meeting 210. The query message 300 includes both the resource requirements 212 for the requested meeting 210 and the created overlap sets of constructs 260, 270, 280. In another embodiment, the scheduling system 120 may only send the overlap sets of constructs that are necessary to convey the resource requirements needed to schedule the requested meeting 210. For example, in the example embodiments illustrated in FIGS. 2A-2D, the scheduling system 120 may only need to send the first and third overlap sets of constructs 260, 280 to the resource allocation system 140 since the first overlap set 260 and the second overlap set 270 both contain the construct 232 for Meeting B 230. Because the first overlap set 260 contains both the construct 222 of the Meeting A 220 and the construct 232 of Meeting B 230, any determination made by the resource allocation system 140 for the second time period 252 would apply for the third time period 254 as the requested meeting 210 only overlaps one of the meetings from the second time period 252 in the third time period 254. Thus, if the resources are available for the second time period 252, then the resources would also be available for the third time period 254.

FIGS. 3B and 3C illustrate example embodiments of messages or notifications 310, 320 sent from the resource allocation system 140 to the scheduling system 120 in response to receiving the query message 300. As further detailed below, after the resource allocation system 140 receives the query message 300 from the scheduling system 120, the resource allocation system 140 makes a determination as to whether or not the resources 170 are available for supporting and facilitating the requested meeting 210. The resource allocation system 140 makes the determination based on the resource requirements 212 for the requested meeting 210 and the overlap sets of constructs 260, 270, 280, all of which are included in the query message 300. In the event that the resource allocation system 140 determines that the resources 170 are available for the requested meeting 210, the resource allocation system 140 sends notification 310 back to the scheduling system 120. This notification 310 may include some additional information notifying the scheduling system 120 that the resources 170 are available for the requested meeting 210, as well as a construct 312 that represents the resources 170 that the resource allocation system 140 has allocated to the requested meeting 210. In another embodiment, the notification 310 may be include only the construct 312. As illustrated in FIG. 3B, the construct 312 created by the resource allocation system 140 indicates that the resource allocation system 140 has allocated or delegated four ports on resource 1 to the requested meeting 210. Thus, if the scheduling system 120 receives a construct 312 from the resource allocation system 140, the scheduling system 120 then knows that resources 170 exist for the requested meeting 210 and is able to schedule the requested meeting 210. The scheduling system 120 may also save the construct 312 in the meeting database 160 such that the construct 312 is associated with the requested meeting 210 (which would then be a scheduled meeting).

However, as illustrated in FIG. 3C, in the event that the resource allocation system 140 determines that the resources 170 are not available for the requested meeting 210, the resource allocation system 140 sends back to the scheduling system 120 a notification 320 that indicates that not enough resources 170 are available for the requested meeting 210. This notification 320 may be include a message that can be understood by the scheduling system 120, or may simply not include a construct 312. If the scheduling system 120 receives a notification 320 from the resource allocation system 140 that does not contain a construct 312, then the scheduling system 120 will realize that the resources 170 for the requested meeting 210 are not available.

Figure 4:
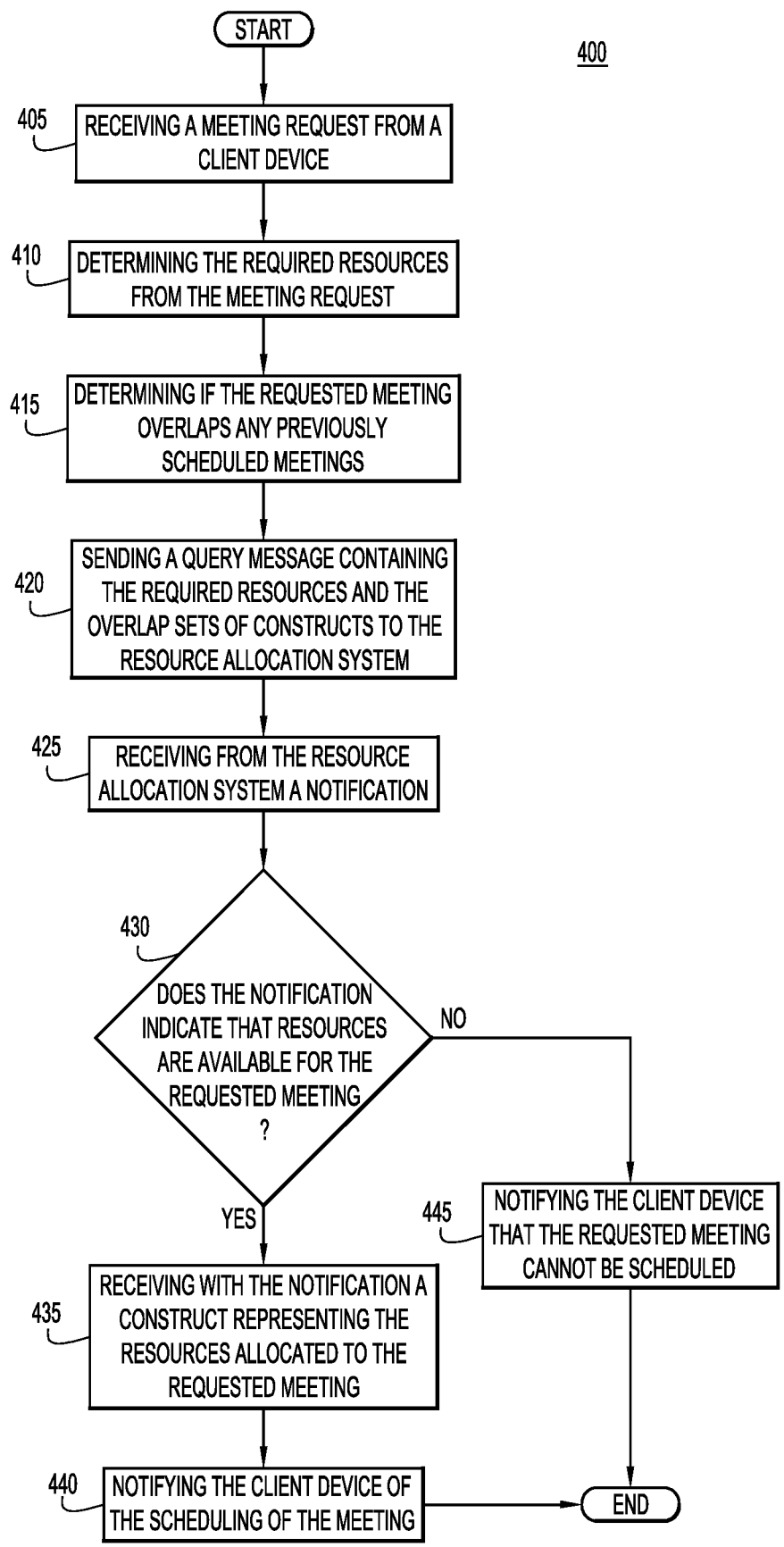
FIG. 4 is a flow chart of a method for scheduling a requested meeting, according to an example embodiment.

With reference to FIG. 4, and continued reference to FIGS. 1, 2A-2D, and 3A-3B, illustrated is a flow chart of operations 400 performed by the scheduling system 120 to determine whether or not to schedule a meeting. Initially, at 405, the scheduling system 120 receives a meeting request from one or more of the client device(s) 110(1)-110(N). At 410, the scheduling system 120 determines the resource requirements from the meeting request. The resource requirements may include, but are not limited to, information regarding the type of meeting (video conference, audio conference, presentation, etc.), the number of participants, the characteristics and statistics of each meeting participant's system, etc. For example, in the example embodiments illustrated in FIGS. 2A-2D, the requested meeting 210 requires the resources that are capable of handling or supporting HD video for four participants. The scheduling system 120 may extract this information from the meeting request received from the client device 110(1)-110(N) of the participant attempting to schedule the meeting.

At 415, the scheduling system 120 then determines if the requested meeting overlaps any previously scheduled meetings. As illustrated in the example embodiments of FIGS. 2A-2D, the requested meeting 210 spans from the second time period 252 through the third and fourth time periods 254, 256, and to the end of the fifth time period 258. Furthermore, the requested meeting 210 overlaps Meeting A 220 and Meeting B 230 during the second time period 252, overlaps only Meeting B 230 during the third time period 252, does not overlap any meetings during the fourth time period 256, and overlaps only Meeting C 240 during the fifth time period 258. The scheduling system 120, in determining if the requested meeting overlaps any previously scheduled meetings, further collects the constructs from each of the overlapping previously scheduled meetings and groups the constructs according to whether or not the requested meeting overlaps their associated previously scheduled meeting during the same time period. Thus, as previously explained with respect to the example embodiments illustrated in FIGS. 2A-2D, the scheduling server 120 collects a first overlap set of constructs 260 (containing the construct 222 of Meeting A 220 and the construct 232 of Meeting B 230), a second overlap set of constructs 270 (containing only the construct 232 of Meeting B 230), and a third overlap set of constructs 280 (containing only the construct 242 of Meeting C 240). At 420, the scheduling system 120 sends a query message to the resource allocation system 140, where the query message contains the resource requirements for the requested meeting and the overlap sets of constructs identified by the scheduling system 120 at 415. As shown in the example embodiment illustrated in FIG. 3A, the scheduling system 120 sends the resource allocation system 140 a query message 300. The query message 310 includes the resource requirements 212 of HD video for four participants, and the three overlap sets of constructs 260, 270, 280 of the previously scheduled meetings 220, 230, 240 that at least partially overlap the requested meeting 210.

Furthermore, at 425, the scheduling system 120 receives from the resource allocation system 140 a notification in response to the query message sent to the resource allocation system 140 at 420. At 430, the scheduling system 120 determines whether the received notification indicates that the resources are available for the requested meeting. As illustrated in the example embodiments of FIGS. 3B and 3C, the scheduling system 120 may receive either a notification 310 that indicates that the resources 170 are available for the requested meeting 210 (FIG. 3B) or a notification 320 that indicates that the resources 170 are not available for the requested meeting 210 (FIG. 3C). If, at 430, the scheduling system 120 receives a notification that the resources 170 are available for the requested meeting, then, at 435, the notification would include a construct representing the resources that have been allocated by the resource allocation system 140 to the requested meeting. As illustrated in FIG. 3B, the notification 310 received by the scheduling system 120 includes a construct 312 that indicates that the resource allocation system 140 has allocated four ports on resource 1 for the requested meeting 210. The scheduling system 120 may save this construct 312 in the meeting database 160 such that it is associated with the saved requested meeting 210. In addition, the scheduling system 120 may store information regarding what needs to be provided in order to conduct/participate in the meeting (e.g., URLs, numbers, etc.) and information regarding the placement of the meeting (e.g., whether or not the meeting can be moved). Often, meetings cannot be moved when meeting overlaps would cascade into other meeting overlaps. In response to receiving the notification that the resources 170 are available for the requested meeting, at 440, the scheduling system 120 may send a notification to the client device(s) 110(1)-110(N) that the requested meeting has been scheduled.

However, if, at 430, the scheduling system 120 receives a notification that the resources 170 are not available for the requested meeting, then the notification would not include a construct for the requested meeting. At 445, the scheduling system 120 would notify the client device(s) 110(1)-110(N) that the requested meeting cannot be scheduled. As illustrated in FIG. 3C, the notification 320 received by the scheduling system 120 contains information or data that indicates to the scheduling system that the resources 170 are not available for the requested meeting 210. When the resources 170 are not available for the requested meeting, the resource allocation system 140 does not create a construct for the requested meeting.

Figure 5:
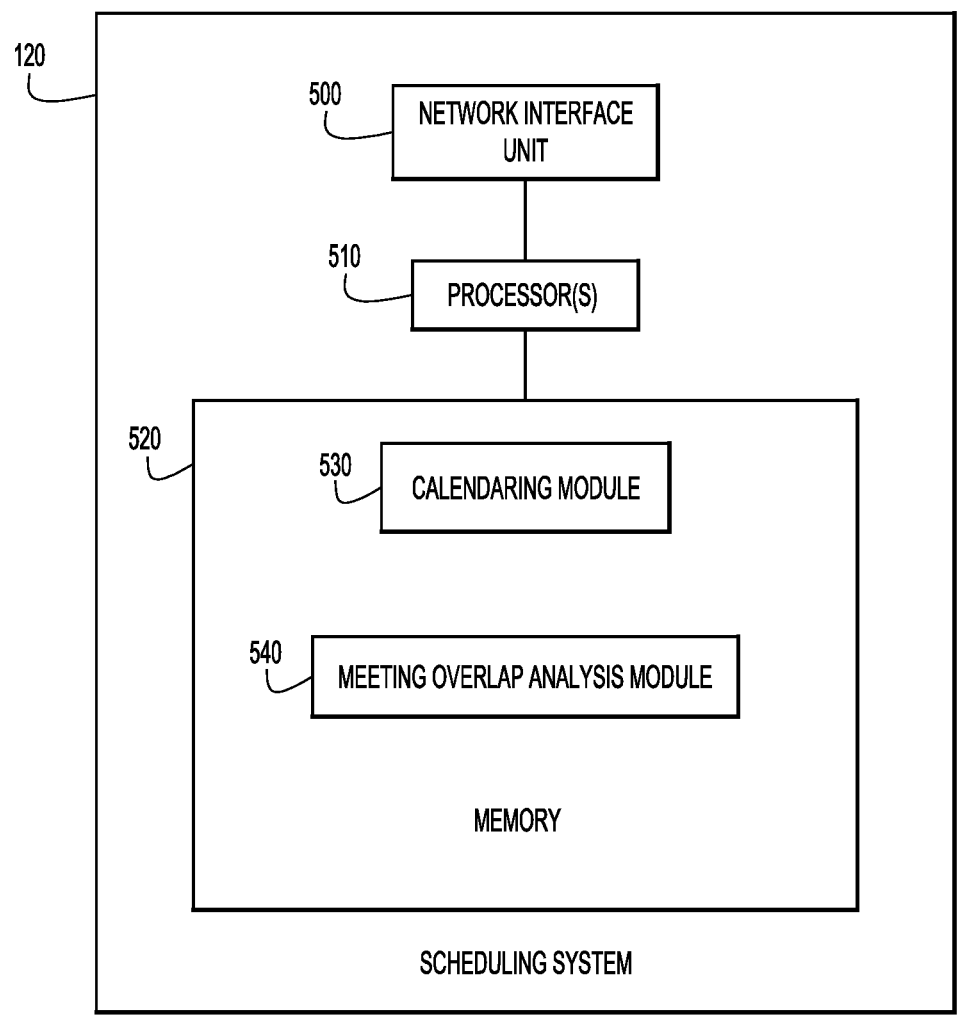
FIG. 5 is a block diagram of the scheduling system illustrated in FIG. 1, wherein the scheduling system is configured to query the resource allocation system when attempting to schedule a requested meeting, in accordance with an example embodiment.

Illustrated in FIG. 5 is an example block diagram of the scheduling system 120 configured to perform the techniques presented herein. As shown, the scheduling system 120 includes a network interface unit 500, one or more processor(s) 510, and a memory 520. The network interface unit 500 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network, such as one or more network interface cards (NICs). Network interface unit 500 may include a wireless network interface unit (wireless NIC) to facilitate wireless communication over networks.

The processor(s) 510 may be embodied by one or more microprocessors or microcontrollers, and execute software instructions stored in memory 520 for the calendaring module 530 and the meeting overlap analysis module 540 in accordance with the techniques presented herein in connection with FIGS. 1, 2A-2D, 3A-3C, and 4.

Memory 520 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 520 may include one or more tangible (e.g., non-transitory) computer readable storage media (e.g., a memory device) encoded with software comprising computer executable instructions, and when the software is executed by the processor(s) 510, the processor(s) 510 are operable to perform the operations described herein by executing instructions associated with the calendaring module 530 and the meeting overlap analysis module 540. In other approaches, the calendaring module 530 and the meeting overlap analysis module 540 may be stored remotely, external to the scheduling system 120, but accessible by the processor(s) 510. The calendaring module 530 enables the scheduling system 120 to schedule and save meetings received from client device(s) 110(1)-110(N) within a calendar. Thus, the calendaring module 530 enables the scheduling system 120 to maintain dates and time. The calendaring module 530 may also enable the scheduling system 120 to send notifications to client device(s) 110(1)-110(N) with regard to the scheduled meetings. Additionally, the calendaring module 530 may enable the scheduling system 120 to store the details of each of the scheduled meetings.

The meeting overlap analysis module 540 enables the scheduling system 120 to determine and identify any previously scheduled meetings that at least partially overlap a requested meeting when receiving a request to schedule a meeting. As explained above with respect to FIGS. 2A-2D, the meeting overlap analysis module 540 enables the scheduling system 120 to identify and group the constructs from each of the overlapping previously scheduled meetings into overlap sets of constructs. The meeting overlap analysis module 540 further enables the scheduling system 120 to send and receive query messages, constructs, and other notifications with the resource allocation system 140.

The functions of the processor(s) 510 may be implemented by logic encoded in one or more tangible computer readable storage media or devices (e.g., storage devices compact discs, digital video discs, flash memory drives, etc.

and embedded logic such as an ASIC, digital signal processor instructions, software that is executed by a processor, etc.).

While FIG. 5 shows that the scheduling system 120 may be embodied as a dedicated physical device, it should be understand that the functions of the scheduling system 120 may be embodied as software running in a data center/cloud computing system, together with numerous other software applications.

Figure 6:
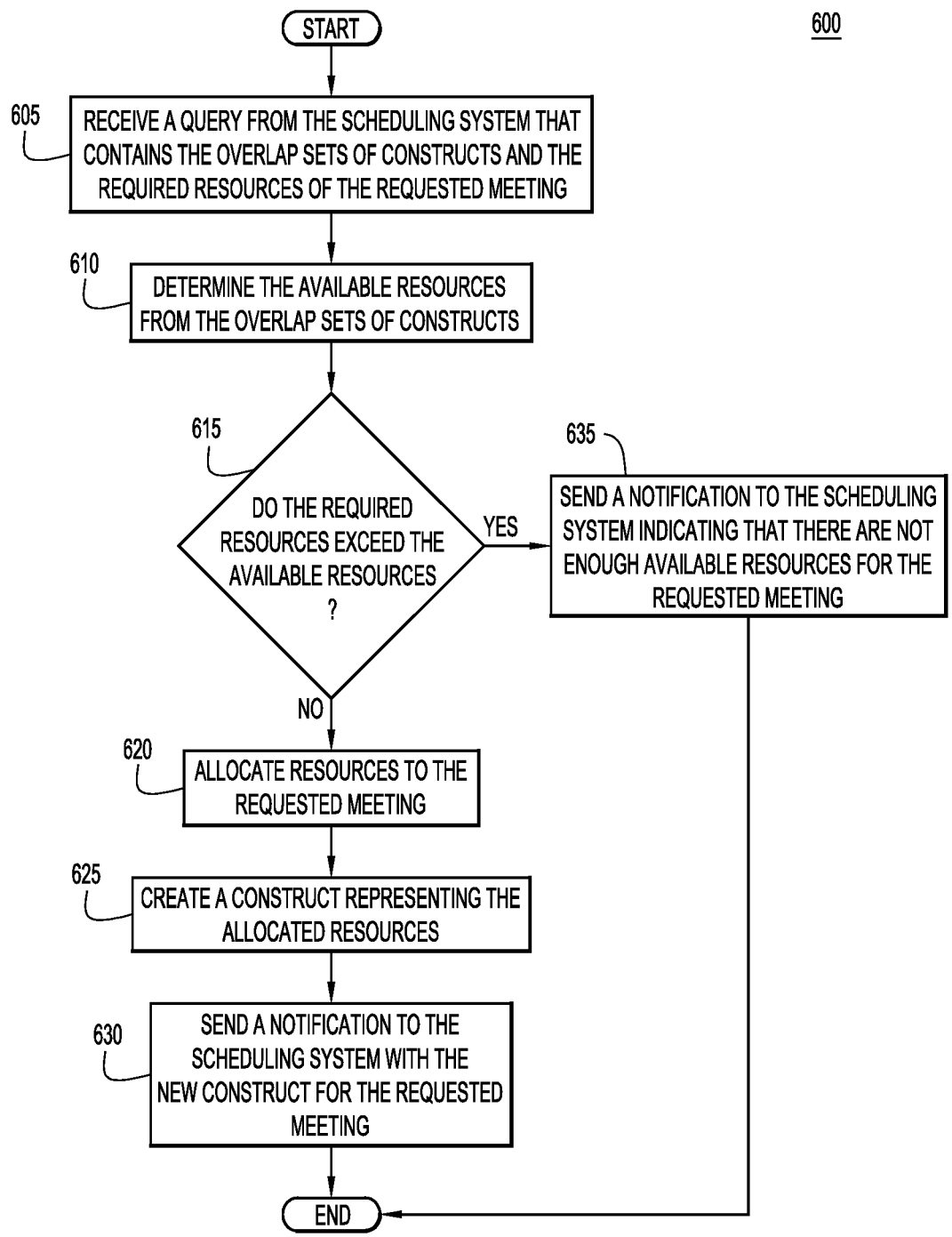
FIG. 6 is a flow chart of a method for determining if sufficient resources are available to schedule the requested meeting, according to an example embodiment.

With reference to FIG. 6, and continued reference to FIGS. 1, 2A-2D, 3A-3B, and 4, illustrated is a flow chart of operations 600 performed by the resource allocation system 140 to analyze the constructs received from the scheduling system 120 and determine whether or not the resources 170 are available for the requested meeting. Initially, at 605, the resource allocation system 140 receives the query message from the scheduling system 120, where the query message contains the resource requirements of the requested meeting and the overlap sets of constructs of the previously scheduled meetings that overlap the requested meeting. As shown in the example embodiment illustrated in FIG. 3A, the resource allocation system 140 receives query message 300, which includes the resource requirement 212 of HD video for four participants, and the three overlap sets of constructs 260, 270, 280 of the previously scheduled meetings 220, 230, 240 that overlap the requested meeting 210. At 610, the resource allocation system 140 determines the resources 170 that are available for the requested meeting 210 based on the total number of resources 170 and the overlap sets of constructs received in the query message. The resource allocation system 140 may determine which resources 170 have been previously allocated to the previously scheduled meetings by analyzing the overlap sets of constructs and may determine which of the resources 170 are still available in light of the overlap sets of constructs.

At 615, the resource allocation system 140 then determines whether or not the resource requirements of the requested meeting exceed the number of resources 170 which are still available after taking into account the resources 170 that have been allocated to the previously scheduled meetings as indicated by the overlap sets of constructs. For example, in the example embodiments illustrated in FIG. 3A, the resource allocation system 140 would determine whether the resources 170 are available to provide HD video for four participants in view of the overlap sets of constructs 260, 270, 280. If, at 615, the resource allocation system 140 determines that the resource requirements do not exceed the available resources 170, then, at 620, the resource allocation system 140 would allocate at least some of the available resources 170 to the requested meeting. The resources allocated by the resource allocation system 140 are sufficient for enabling and facilitating the requested meeting. For the example embodiment illustrated in FIG. 3A, the resource allocation system 140 would allocate enough available resources 170 to support HD video for four participants.

At 625, the resource allocation system 140 may then create a construct that represents the resources 170 that have been allocated for the requested meeting. In some embodiments, the construct may only be readable by the resource allocation system 140 (i.e., the scheduling server 120, while capable of saving the constructs, may not be configured to read the data contained in the constructs created by the resource allocation system 140). As illustrated in the example embodiment illustrated in FIG. 3B, the resource allocation system 140 created a construct 312 for the requested meeting 210, where, according to the construct 312, the resource allocation system 140 has allocated or delegated four ports on resource 1 to satisfy the resource requirement 212 of the HD video for four participants. At 630, the resource allocation system 140 may send a notification to the scheduling system 120 that notifies the scheduling system 120 that the resources 170 are available for the requested meeting. The notification sent by the resource allocation system 140 includes the construct representing the resources 170 allocated to the requested meeting. As illustrated in the example embodiment illustrated in FIG. 3B, the resource allocation system 140 sends the scheduling system 120 notification 310 that contains construct 312 representing the resources 170 allocated for the requested meeting 210.

However, if, at 615, the resource allocation system 140 determines that the resource requirements of the requested meeting exceed the amount of available resources 170, then, at 635, the resource allocation system 140 sends a notification to the scheduling system 120 that indicates that the resources 170 are not available for the requested meeting and that the meeting cannot be scheduled. As illustrated in FIG. 3C, the notification 320 sent by the resource allocation system 140 contains information or data that indicates to the scheduling system 120 that the resources 170 are not available for the requested meeting 210.

Figure 7:
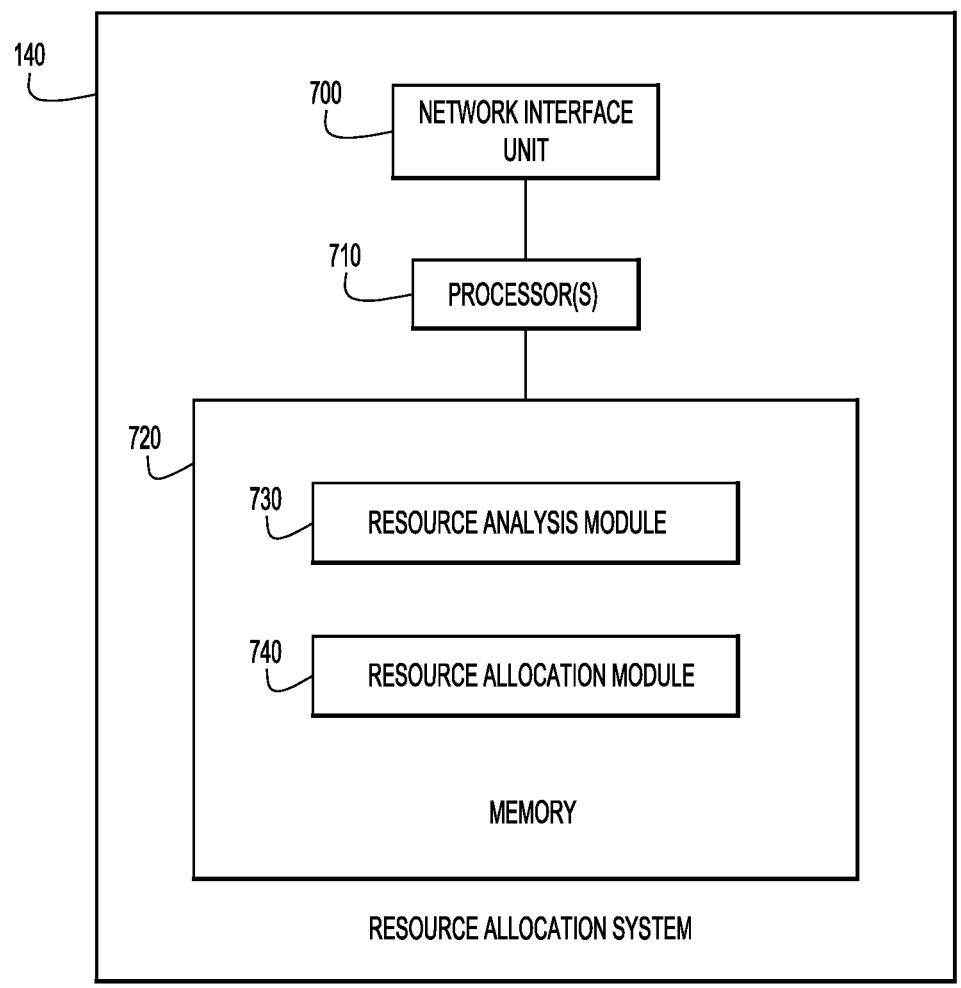
FIG. 7 is a block diagram of the resource allocation system illustrated in FIG. 1, wherein the resource allocation system is configured to determine if enough resources are available, in accordance with an example embodiment.

Illustrated in FIG. 7 is an example block diagram of the resource allocation system 140 configured to perform the techniques presented herein. As shown, the resource allocation system 140 includes a network interface unit 700, one or more processor(s) 710, and a memory 720. The network interface unit 700 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 700 may include a wireless network interface unit to facilitate wireless communication over networks.

The processor(s) 710 may be embodied by one or more microprocessors or microcontrollers, and execute software instructions stored in memory 720 for the resource analysis module 730 and the resource allocation module 740 in accordance with the techniques presented herein in connection with FIGS. 1, 2A-2D, 3A-3C, 4, and 6.

Memory 720 may include one or more computer readable storage media that may include ROM, RAM, magnetic disk storage media devices, optical storage media devices, flash memory devices, electrical, optical, or other physical/tangible memory storage devices.

Thus, in general, the memory 720 may include one or more tangible (e.g., non-transitory) computer readable storage media (e.g., a memory device) encoded with software comprising computer executable instructions, and when the software is executed by the processor(s) 710, the processor(s) 710 are operable to perform the operations described herein by executing instructions associated with the resource analysis module 730 and the resource allocation module 740. In other approaches, the resource analysis module 730 and the resource allocation module 740 may be stored remotely, external to the resource allocation system 140, but accessible by the processor(s) 710. The resource analysis module 730 enables the resource allocation system 140 to extract the resource requirements and the overlap set of constructs from a query message received from a scheduling system 120. The resource analysis module 730 further enables the resource allocation system 140 to analyze the resources 170 and any received overlap sets of constructs in order to make a determination as to the amount of available resources 170. The resource analysis module 730 enables the resource allocation system 140 to read the constructs from the overlap sets of constructs and determine which of the resources 170 have already been previously allocated to the previously scheduled meetings. The resource analysis module 730 also enables the resource allocation system to compare the available resources 170 with the resource requirements of the requested meeting and make a determination as to whether or not the available resources are sufficient for supporting the requested meeting.

The resource allocation module 740 enables the resource allocation system 140 to allocate at least a portion of the available resources 170 to the requested meeting based on the resource requirements of the requested meeting and the overlap set of constructs from the previously scheduled meetings. The resource allocation module 740 may further enable the resource allocation system 140 to create a construct that represents the resources allocated to the requested meeting. The resource allocation module 740 further enables the resource allocation system 140 to create the construct such that only the resource allocation system 140 is capable of decoding which resources have been allocated to a meeting.

The functions of the processor(s) 710 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 7 shows that the resource allocation system 140 may be embodied as a dedicated physical device, it should be understand that the functions of the resource allocation system 140 may be embodied as software running in a data center/cloud computing system, together with numerous other software applications.

Figure 8:
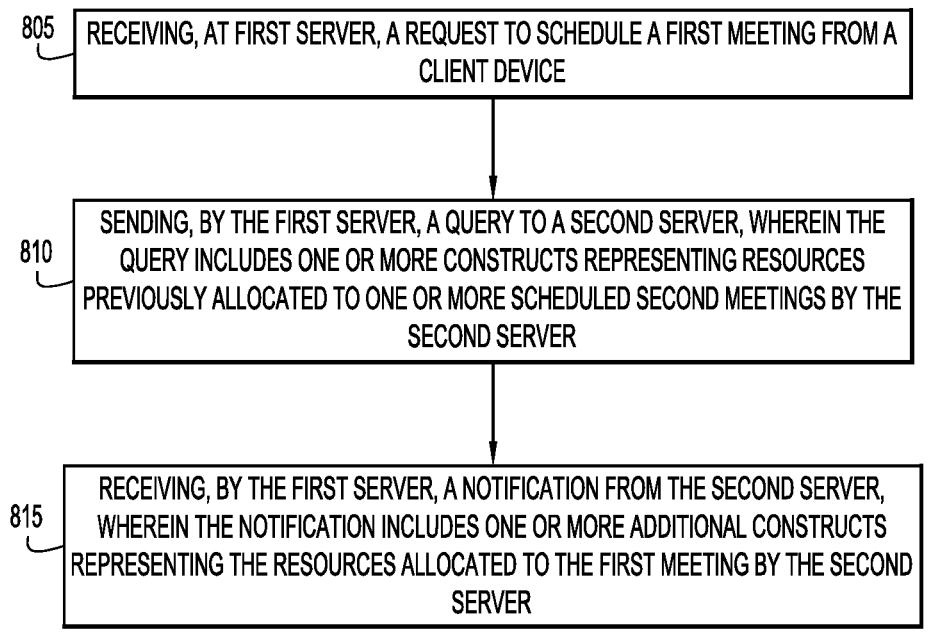
FIG. 8 is a flow chart depicting a process for scheduling a requested meeting based on the resources available, according to an example embodiment.

With reference to FIG. 8, illustrated is a flow chart of a method 800 performed by the scheduling system 120 for determining whether or not to schedule a meeting through interactions with the resource allocation system 140. Reference is also made to FIGS. 1, 2A-2D, 3A-3D, and 4-7 for purposes of the description of FIG. 8. At 805, the scheduling system 120 receives a request to schedule a first meeting, where the request is received from client device(s) 110(1)-110(N). The request to schedule the first meeting may include an indication of the resource requirements for supporting the first meeting. At 810, the scheduling system 120 sends a query message to the resource allocation system 140. The query message may include one or more constructs configured to represent the resources previously allocated to one or more previously scheduled meetings. These previously scheduled meetings may at least partially overlap the requested meeting. The constructs sent to the resource allocation system 140 in the query message are constructs created by the resource allocation system 140 when each of the previously scheduled meetings were scheduled. At 815, the scheduling system 120 receives a notification from the resource allocation system 140 that the resources 170 are available for supporting the requested meeting. The notification received by the scheduling system 120 includes a construct representing the resources that have been allocated to the requested meeting by the resource allocation system 140.

In summary, when a scheduling system receives a request to schedule a meeting, the scheduling system determines any at least partially overlapping previously scheduled meetings and communicates with the resource allocation system to determine if enough resources are available to support the requested meeting. The resource allocation system may allocate or delegate resources to the requested meeting if the resources area available. The techniques presented herein eliminates the need for the scheduling system to understand the logic and resource capabilities of each type of collaboration system. Thus, the scheduling system does not need to fully understand how the collaboration systems work and function, which saves time when developing the scheduling system or developing updates for the scheduling system. Furthermore, the techniques presented herein also eliminate the need for the resource allocation system to understand the complicated concepts of time and a calendar. Thus, there is no longer a need to synchronize calendars between multiple complex systems, which reduces the possibility of scheduling errors. The environment and techniques described above also creates the ability of running a hybrid scheduling system, where the resource allocation system can be an on premise system, and the scheduling system may be located in the cloud. When increasing the resources available to the collaboration systems, the scheduling system does not need to be updated since the resource allocation system will be able to take into account the updated resources when receiving queries from the scheduling system.

In one form, a method is provided comprising: receiving, at a first server, a request to schedule a first meeting from a client device; sending, by the first server, a query to a second server, wherein the query includes one or more constructs representing resources previously allocated by the second server to one or more scheduled second meetings; and receiving, by the first server, a notification from the second server, wherein the notification includes one or more additional constructs representing the resources allocated to the first meeting by the second server.

In another form, an apparatus is provided comprising: a network interface unit of a first server configured to enable communications over a network; and a processor of the first server coupled to the network interface unit, the processor configured to: receive a request to schedule a first meeting from a client device; send a query to a second server, wherein the query includes one or more constructs representing resources previously allocated by the second server to one or more scheduled second meetings; and receive a notification from the second server, wherein the notification includes one or more additional constructs representing the resources allocated to the first meeting by the second server.

In yet another form, a (non-transitory) processor readable medium is provided. The medium stores instructions that, when executed by processor of a first server, cause the processor to: receive a request to schedule a first meeting from a client device; send a query to a second server, wherein the query includes one or more constructs representing resources previously allocated by the second server to one or more scheduled second meetings; and receive a notification from the second server, wherein the notification includes one or more additional constructs representing the resources allocated to the first meeting by the second server.

The above description is intended by way of example only. Various modifications and structural changes may be made therein without departing from the scope of the concepts described herein and within the scope and range of equivalents of the claims.

What is claimed is:

1. A method comprising:
   obtaining, at a first server, a request to schedule a first meeting from a client device;
   determining, by the first server, that the first meeting and a given scheduled second meeting of one or more scheduled second meetings overlap during at least two time periods defined by start times or end times of the first meeting and the one or more scheduled second meetings;
   providing, by the first server, a query to a second server, wherein the query includes one or more constructs representing resources previously allocated by the second server to the given scheduled second meeting for one time period of the at least two time periods; and
   obtaining, by the first server, a notification from the second server, wherein the notification includes one or more additional constructs representing resources allocated to the first meeting by the second server.

2. The method of claim 1, wherein the first meeting and the one or more scheduled second meetings are video conference meetings.

3. The method of claim 2, wherein the first server is a scheduling server and the second server is a server configured to manage resources of a video conference system.

4. The method of claim 1, wherein the request to schedule the first meeting includes an indication of the resources allocated to the first meeting.

5. The method of claim 4, wherein the query to the second server further includes the indication of the resources allocated to the first meeting.

6. An apparatus comprising:
   a network interface unit of a first server configured to enable communications over a network; and
   a processor of the first server coupled to the network interface unit, the processor configured to:
      obtain a request to schedule a first meeting from a client device;
      determine that the first meeting and a given scheduled second meeting of one or more scheduled second meetings overlap during at least two time periods defined by start times or end times of the first meeting and the one or more scheduled second meetings;
      provide a query to a second server, wherein the query includes one or more constructs representing resources previously allocated by the second server to the given scheduled second meeting for one time period of the at least two time periods; and
      obtain a notification from the second server, wherein the notification includes one or more additional constructs representing resources allocated to the first meeting by the second server.

7. The apparatus of claim 6, wherein the first meeting and the one or more scheduled second meetings are video conference meetings.

8. The apparatus of claim 7, wherein the first server is a scheduling server and the second server is a server configured to manage resources of a video conference system.

9. The apparatus of claim 6, wherein the request to schedule the first meeting includes an indication of the resources allocated to the first meeting.

10. The apparatus of claim 9, wherein the query to the second server further includes the indication of the resources allocated to the first meeting.

11. A non-transitory processor readable medium storing instructions that, when executed by a processor of a first server, cause the processor to:
    obtain a request to schedule a first meeting from a client device;
    determine that the first meeting and a given scheduled second meeting of one or more scheduled second meetings overlap during at least two time periods defined by start times or end times of the first meeting and the one or more scheduled second meetings;
    provide a query to a second server, wherein the query includes one or more constructs representing resources previously allocated by the second server to one or more scheduled second meetings; and
    obtain a notification from the second server, wherein the notification includes one or more additional constructs representing resources allocated to the first meeting by the second server.

12. The non-transitory processor readable medium of claim 11, wherein the first meeting and the one or more scheduled second meetings are video conference meetings.

13. The non-transitory processor readable medium of claim 12, wherein the first server is a scheduling server and the second server is a server configured to manage resources of a video conference system.

14. The non-transitory processor readable medium of claim 11, wherein the request to schedule the first meeting includes an indication of the resources allocated to the first meeting, and the query to the second server further includes the indication of the resources allocated to the first meeting.

15. The method of claim 1, further comprising:
    saving, by the first server, the one or more additional constructs in a meeting database.

16. The method of claim 1, further comprising:
    providing, by the first server, a notification that the first meeting has been scheduled.

17. The apparatus of claim 6, wherein the processor is further configured to:
    save the one or more additional constructs in a meeting database.

18. The apparatus of claim 6, wherein the processor is further configured to:
    provide a notification that the first meeting has been scheduled.

19. The non-transitory processor readable medium of claim 11, wherein the instructions further cause the processor to:
    save the one or more additional constructs in a meeting database.

20. The non-transitory processor readable medium of claim 11, wherein the instructions further cause the processor to:
    provide a notification that the first meeting has been scheduled.

* * * * *